United States Patent [19]

Vaughan et al.

[11] 4,326,105

[45] Apr. 20, 1982

[54] DIAL PULSE DETECTOR

[75] Inventors: Brian J. N. Vaughan; Brian J. Pascas, both of Ottawa, Canada

[73] Assignee: Mitel Corporation, Kanata, Canada

[21] Appl. No.: 119,900

[22] Filed: Feb. 8, 1980

[30] Foreign Application Priority Data

Dec. 21, 1979 [CA] Canada .................................. 342522

[51] Int. Cl.³ ............................................. H04Q 1/36
[52] U.S. Cl. .................................. 179/16 EA; 328/164
[58] Field of Search ........... 179/16 E, 16 EA, 16 EC, 179/6.09, 6.11; 328/164, 115, 150

[56] References Cited

U.S. PATENT DOCUMENTS

| | | | |
|---|---|---|---|
| 2,938,081 | 5/1960 | Rouault | 179/16 EA |
| 3,573,503 | 4/1971 | Macey | 179/16 EA |
| 4,071,708 | 1/1978 | Kaplan et al. | 179/16 E |

FOREIGN PATENT DOCUMENTS 1042558  9/1966  United Kingdom .......... 179/16 EA

*Primary Examiner*—Bernard Konick
*Assistant Examiner*—Randall P. Myers
*Attorney, Agent, or Firm*—Alan H. Levine

[57] ABSTRACT

A dial pulse detection circuit for partial correction of grossly distorted line current dial pulses, which provides square wave output signals for use by later timing detection circuitry. To detect such dial pulses, the present invention establishes an upper and a lower detection threshold. For a valid dial pulse to be detected, the line current must drop through both thresholds, and then rise again through at least the lower threshold. With the provision of a detection delay following detection of the leading edge of a dial pulse, the presence of a valid dial pulse can be registered. The present technique used in detecting the presence of dial pulses substantially reduces the chances of rejection of a valid dial pulse which has a grossly distorted waveform.

17 Claims, 7 Drawing Figures

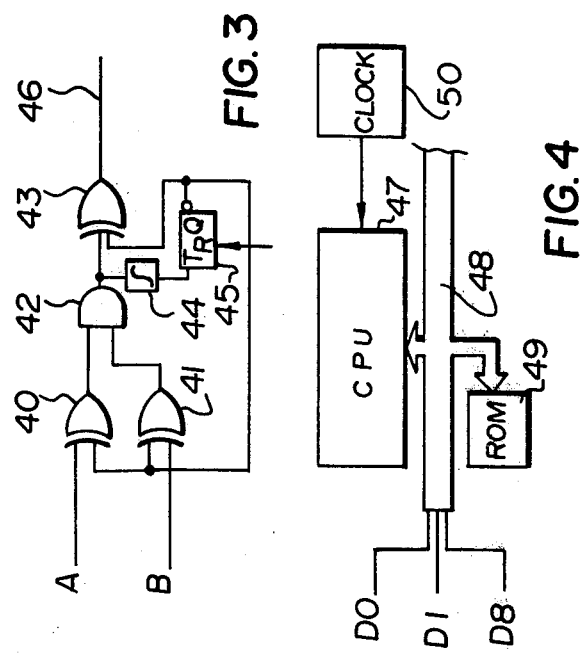
FIG. 3
FIG. 4
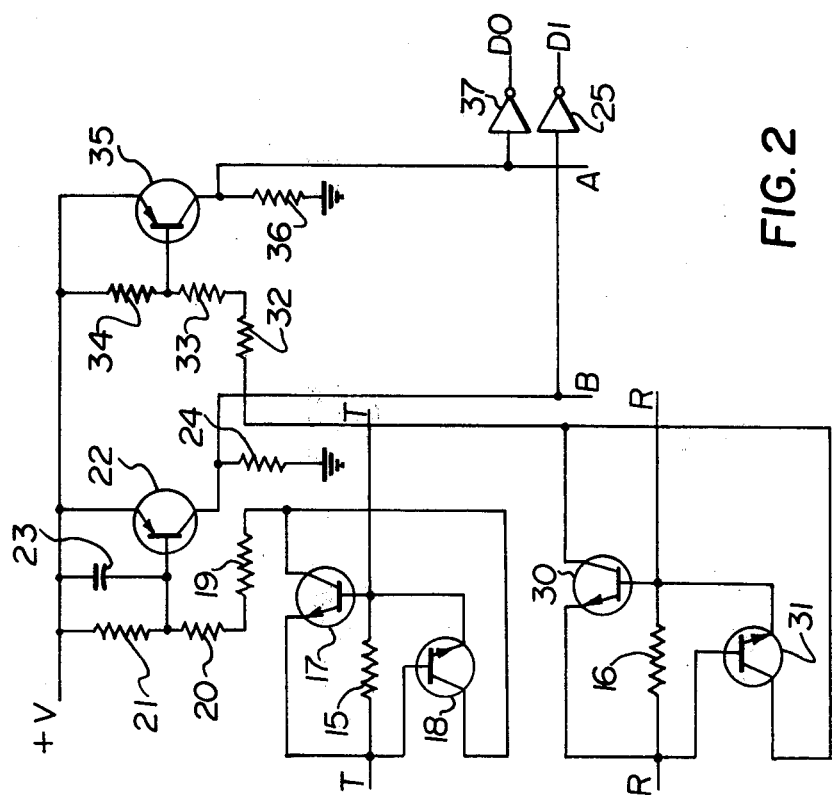
FIG. 2

DIAL PULSE DETECTOR

This invention relates to means for detecting the presence of dial pulses in telephone circuits.

BACKGROUND OF THE INVENTION

Rotary dial telephones encode dialed digits by repetitively breaking the line current in a subscriber's loop, the number of breaks corresponding to the dialed digit. Dial pulse receivers and repeaters have from the early days of telephony utilized electromagnetic sensing of the dial pulses, by which a solenoid in a relay causes switch contacts to repetitively close, or in a stepping switch, contacts are caused to step along a row or column of switches.

While the repetitive line current breaking function theoretically provides square wave current pulses carried by the telephone line, in practice the form of the dial pulse current is usually far from perfect. Variations from the ideal square wave are usually caused by lines inductance, line leakage, leading and trailing edge ringing, cross talk, gliches, etc. While electromagnetic dial pulse receivers have been found to be somewhat tolerant of most of the imperfections in the waveform, more modern sensitive solid state dial pulse receivers have not had similar tolerance. Special circuitry has been incorporated into some solid state receivers for debouncing leading edge ringing waveforms, etc.

However it has been difficult to reliably detect dial pulses when there are gross distortions of the dial pulse current waveform. The present invention is directed to a reliable solid state circuit for dial pulse detection when the current pulses are grossly distorted.

SUMMARY OF THE INVENTION

To detect such dial pulses, the present invention establishes an upper and a lower detection threshold. For a valid dial pulse to be detected, the line current must drop through both thresholds, and then rise again through at least the lower threshold. With the provision of a detection delay following detection of the leading edge of a dial pulse, the presence of a valid dial pulse can be registered. The present technique used in detecting the presence of dial pulses substantially reduces the chances of rejection of a valid dial pulse which has a grossly distorted waveform.

In general, the invention is a dial pulse detection circuit comprising means for detecting a first line current transition through a predetermined upper threshold, and for establishing a dial pulse leading edge in response to said detection, means for ignoring a first but detecting a second line current transition through a predetermined lower threshold and for establishing a dial pulse trailing edge, and means for ignoring a second line current transition through the upper threshold, whereby a complete dial pulse is established.

More particularly, the present dial pulse detection circuit is comprised of means for detecting the level of line current relative to a predetermined upper threshold, and for providing a 1 or 0 data output signal depending on the detected level, and means for detecting the level of line current relative to a predetermined lower threshold, and for providing a second 1 or 0 data output signal depending on the level. A circuit is provided for receiving the first and second output signals and for establishing a dial pulse leading edge upon detection of a first line current transition to a level below the upper threshold and for establishing a dial pulse trailing edge upon subsequent detection of a line current transition from below the lower threshold to a level above the lower threshold.

The latter circuit portion of the invention can be a logic circuit, or a circuit including a microprocessor controlled by signals stored in a read only memory (ROM).

Of course the line current can be presented to the present circuit in reverse polarity, and therefore the more general form of the dial pulse detection circuit is comprised of a circuit for detecting a first line current transition through a predetermined first threshold, and for establishing a dial pulse leading edge in response to the detection, a circuit for ignoring the first line current transition through a predetermined second threshold which immediately follows a transition through the first threshold but detecting a second line current transition through a second threshold and for establishing a dial pulse trailing edge, and a circuit for ignoring a second line current transition through the first threshold, whereby a complete dial pulse is established.

We intend the word "ignoring" to mean only with respect to the establishment of the leading or trailing edges of the dial pulse. However the "ignored" line current transitions can be used by the circuitry for other purposes such as to set timing periods, operate logical functions, etc. The "line current" also is intended to mean representation of, translated, or fractions of the actual line current. Circuits can mean actual circuitry, including logic circuits, and/or special purpose computer or microcomputer circuits which are operated under control of stored signal sequences.

INTRODUCTION TO THE DRAWINGS

A better understanding of the invention will be obtained by reference to the detailed description below, and to the following drawings, in which:

FIG. 2 is a schematic diagram of line current sensing circuitry forming part of the present invention;

FIG. 3 is a logic diagram which, when combined with the circuit of FIG. 2, forms one embodiment of the invention, FIG. 4 is a block diagram of a circuit which when combined with the circuit of FIG. 2 forms a second embodiment of the invention.

DESCRIPTION OF THE PREFERRED EMBODIMENT

Figure 1A:
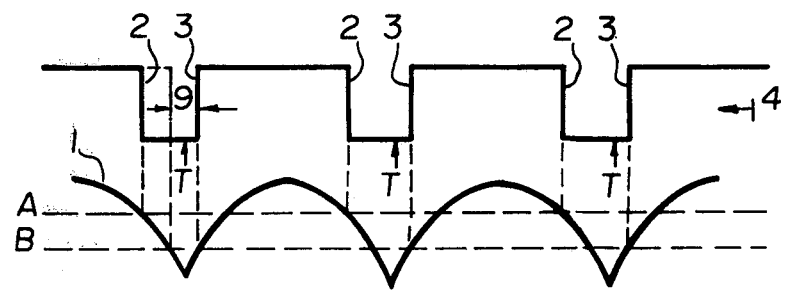
FIGS. 1A, 1B and 1C are example waveform diagrams of distorted dial pulse current signals and square wave signals resulting from the present invention.

Turning first to FIG. 1A, a grossly distorted dial pulse current waveform 1 is shown. This waveform ideally originated as square wave dial pulses current breaks of typically 7 to 13 break pulses per second.

According to the present invention an upper current sensing threshold A and a lower current sensing threshold B are established. In order for a valid dial pulse to be recognized, its current level must pass through both upper and lower thresholds, as is shown.

It is of course assumed that external circuitry not forming part of this invention has previously established the presence of an off-hook condition, and that current is flowing through the subscriber's line at a high level.

The present invention recognizes the first passage of the dial pulse break current waveform from a level higher than the upper threshold to a level lower than the upper threshold, and at that point establishes the "break" leading edge 2 of a dial pulse. The present invention provides logical outputs whereby other external circuitry not forming part of this invention can use the outputs and break a steady line current to form a pulse break in the case of a repeater, or the logical outputs can be used as a digital indication to a receiver of the pulse break. The external circuitry can, for example, be comprised of a CMOS switch which is enabled by the logical outputs of the present invention.

It may be seen in waveform 1, that the dial pulse signal drops below the lower threshold level after dropping below the upper threshold level. The transition of the signal dropping below the lower threshold is ignored.

The dial pulse current waveform 1 then rises from a level below to a level above the lower threshold level. At this point the circuitry establishes the trailing edge 3 of the dial pulse break. The following rise in line current above the upper threshold is ignored.

Subsequent dial pulses cause the operation to repeat, as shown. The resulting output signal from the present invention is the waveform 4, which can be a succession of logical 1's and 0's, corresponding to the generated high and low signal levels, or can control dial pulse repeater equipment which provides ideal square wave pulses to other equipment.

Figure 1B:
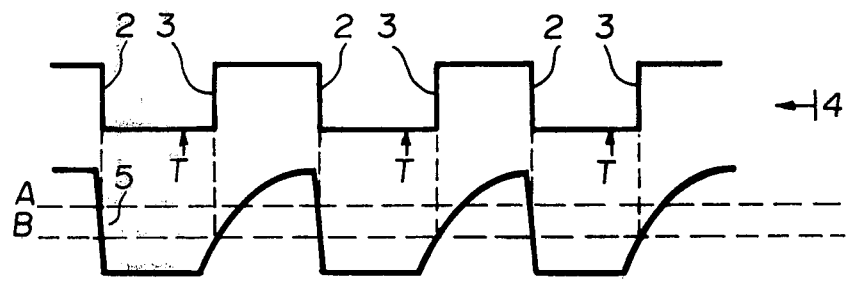

FIG. 1B shows another grossly distorted form of dial pulse current waveform 5 which is sometimes encountered. As may be seen the waveform drops slowly to a low level, then suddenly rises to full line current level.

As described with reference to FIG. 1A, the leading edge 2 of the dial pulse break is established when the line current drops from a level higher than the upper threshold, through the threshold to a level lower than the upper threshold, and the trailing edge of the dial pulse break is established when the dial pulse current rises from a level lower than the lower threshold to a level higher than the lower threshold. In the present example, due to the very steep trailing edge of the break in the dial pulse current waveform, the current rises through both the lower and upper thresholds at nearly the same time. However the rise through the upper threshold is ignored. The resulting ideal output signal is shown as reference 4.

Figure 1C:
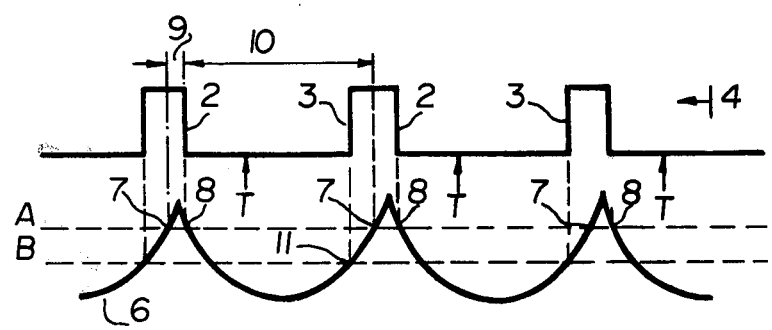

FIG. 1C shows a third form of gross dial pulse current distortion which is sometimes encountered. The dial pulse current waveform 6 has long low-level periods and short, peaked high-level periods, as will be evident from the figure.

In prior art proposals, where the dial pulse current is detected as it passes through a single threshold, an unreliable indication of the presence of dial pulses results, as will be described below.

Assuming that a single threshold exists at threshold A, it will be noted that the dial pulse current rises through the upper threshold at point 7, then drops it through again a short time later at point 8. After a relatively lengthy period, it rises above threshold A at point 7 and after a very short interval drops through again at point 8. Clearly the high level current time is extremely short and the low level current time 10 is very long. Systems which use a single threshold sometimes encounter this problem, which can produce intervals which are shorter than normally specified requirements for the presence of a good pulse.

According to the present invention, a low level threshold B is established in addition to higher threshold A. Now as the line current level drops through the upper threshold at point 8, the leading edge 2 of the dial pulse break is established. It then drops below the lower level threshold, which transition is ignored. When it rises above the level of the lower threshold, e.g. at point 11, the trailing edge 3 of the dial pulse break is established. Clearly the dial pulse break period between points 8 and 11, or leading and trailing edges 2 and 3 is shorter than the period of low level current 10, and the resulting high level periods are longer than would be the result of the described prior art systems.

When debouncing and time lag circuitry is used to ensure that a valid dial pulse is present, the period 9 would in single threshold systems be too short to be recognized by such circuitry, which would sometimes only recognize a very long break in line current.

In the present invention, the period 9 is substantially increased, which affords ample opportunity for pulse recognition circuitry to validate the dial pulses. The usefullness of the present invention should therefore be clear.

In FIG. 1A, the converse is true for the particular waveform. Where a single threshold at the level B is utilized, (e.g., the current signal is substantially D.C. biased) the break period may be so short (e.g. the period 9), that the aforenoted dial pulse recognition circuitry would miss the break period entirely, or at best recognize dial pulses unreliably.

According to the present invention, however, the dial pulse current must pass through both an upper and a lower threshold, and a leading and trailing edge of a reproduced waveform is established through circuitry which clearly stretches the short periods and shortens the long period of the distorted current waveform. The reliability of recognition is therefore substantially enhanced.

A preferred embodiment of the dial pulse current detecting circuitry with means for establishing the two threshold levels is shown in FIG. 2.

Line current is carried by the tip T and ring R leads of the subscriber's loop between a central office and a telephone station set, only a small portion of which is shown in FIG. 1. A small valued resistor 15 is connected in series with the tip lead, and a second small valued resistor 16 is connected in series with the ring lead.

The bases of a pair of similar transistors 17 and 18 are connected to opposite terminals of resistor 15, and the emitters of transistors 17 and 18 are connected to the terminals of resistor 15 to which their bases are not connected. The collectors of transistors 17 and 18 are connected together, and through the series circuit of resistors 19, 20 and 21 to a source of potential +V. Transistors 17 and 18 are of similar polarity, for example NPN for positive polarity of the source of potential (or PNP for negative polarity).

A third transistor 22, of opposite polarity type than transistors 17 and 18 is connected with its base to the junction of resistors 20 and 21 and its emitter to potential source +V. A bypass capacitor 23 is connected between the opposite terminals of resistor 21. Resistor 24 connects the collector of transistor 22 to ground.

When current is carried by the tip lead, a voltage drop is established across resistor 15. If current flow is from right to left, clearly transistor 18 does not conduct since its emitter is more positive than its base. Transistor 17 will conduct if the current flow is sufficient to cause a voltage drop across resistor 15 which biases transistor 17 on. Transistor 17 then becomes conductive in its collector-emitter circuit, and current flows through resistors 19, 20 and 21. These resistors should have a high value in order that the current flowing through the collector of transistor 17 should be small, thus not substantially changing the current flow on the tip lead.

Resistors 19, 20 and 21 thus form a voltage divider, the current flow through which serves to bias transistor 22 on. Current responsively flows in its emitter-collector circuit, raising the potential across resistor 24.

The junction between the collector of transistor 22 and resistor 24 is connected to the input of an inverting buffer 25. When its input goes to high level as described above, its output goes to low level, thus providing a binary "0" or, in inverse logic, a "1".

When current flows from left to right on the tip lead, that is, the left side of the tip lead being more positive than the right, transistor 18 is caused to conduct rather than transistor 17. The remaining circuit including transistor 22 operates as before. Therefore it is clear that the circuit is polarity immune.

When line current flows in either direction along the tip lead, clearly a low level or "0" indication is provided on the output lead D1 of buffer 25. When the line current breaks, as when a dial pulse arrives, the voltage drop across resistor 15 is insufficient to maintain conduction of transistor 17 or 18. Accordingly transistor 22 stops conducting and its output goes to ground, or low level. The output of buffer 25 thus goes to high level, or indicates a "1".

Another pair of transistors 30 and 31 which are similar to transistors 17 and 18 are connected in a manner similar to transistors 17 and 18 across resistor 16 in series with the ring lead. Their collector terminals which are connected together are also connected through the series circuit of resistors 32, 33 and 34 to a source of potential +V. The junction between resistors 33 and 34 is connected to the base of transistor 35, which is of opposite polarity to transistors 30 and 31. Resistor 36 connects the collector of transistor 35 to ground, and its junction with the collector of transistor 35 is connected to the input of inverting buffer 37.

With current passing from left to right or right to left along the ring lead, the just-described circuit operates similarly to the previously described involving transistors 17, 18 and 22. Accordingly when line current flows a high level potential is applied to the input of buffer 37, and a low level signal results at its output lead D0.

The potential +V is chosen to provide a logic level which is compatible with the of logic devices which are used in the buffers and following circuitry. Potential +V can be 5 volts where buffers 25 and 37 are CMOS devices. The output level on leads D0 and D1 are thus at the correct logic levels for following digital circuitry. The circuits involving transistors 22 and 35 thus function as logic level converters.

It is preferred that transistors 17, 18, 30 and 31 should all be of the same type, and matched. Thus the values of resistors 15 and 16 establish the threshold levels of conduction. Where resistors 15 and 16 are of the same value, clearly current flow along the tip and ring leads cause operation of either transistors 17 and 30 or transistors 18 and 31 at the same threshold level.

It is preferred that the resistances of resistors 15 and 16 should be different, in order to establish two different threshold levels, corresponding to upper threshold A and lower threshold B as described with references to FIGS. 1A, 1B and 1C. A useful value for resistor 15 in the tip lead has been found to be 39 ohms, to provide the lower threshold level, and a useful value for resistor 16 in the ring lead has been found to be 24 ohms, to provide the upper threshold level. They should of course be small in order not to substantially increase the line resistance.

Two different embodiments of circuitry for further processing the output signals on leads D0 and D1 are shown, one in FIG. 3 and one in FIG. 4. It is preferred that the circuitry should provide the solution to the equations $$*M = A.B$$

Then during at least a brief steady period T following the transition through the lower threshold B, $$B = \overline{A.B}, \text{ becoming}$$

$$*B = \overline{A} + \overline{B}$$

Then during at least a brief steady period during the transition, $$M = A + B, \text{ becoming}$$

$$*M = A.B$$

where
* designates a steady state condition,
M is the "make" or high level of a resulting output logic level,
B is the "break" or low level of a resulting output logic level
A is a "one" when the line current level exceeds the A or upper threshold, and
B is a "one" when the line current exceeds the B or lower threshold level. A and B correspond to the logic level signals on the D0 and D1 leads.

It is preferred that both the B and M indications, that is, the break and make indicators which are designated at the output of the subject circuit should be time corrected in order to ensure that no noise or glitch has caused operation of the circuit. In other words, the recognition of a steady state *M or *B condition should be delayed by T. Therefore the low level condition of output B and high level output M should be delayed by a time factor longer than the expected time between the passage of the current waveform passing in the same transitional direction through both thresholds. This delay can for example be 30 milliseconds.

Turning now to the circuit of FIG. 3, leads A and B are respectively connected to inputs of EXCLUSIVE OR gates 40 and 41. Due to the form of logic in this figure, leads A and B are connected to respective collectors of transistors 35 and 22. Inverters 37 and 25 are not used. The outputs of gates 40 and 41 are connected to corresponding inputs of AND gate 42, the output of which is connected to one input of EXCLUSIVE OR gate 43. The output of AND gate 42 is also connected to the input of a retriggerable delay circuit 44, the output of which is connected to the toggle input of bistable flip flop 45. The delay in circuit 44 should be the time factor noted in the preceding paragraph. The Q output of flip flop 45 is connected to the second input of EXCLUSIVE OR gate 43, and also to a second input of each of the EXCLUSIVE OR gates 40 and 41. The output lead 46 of EXCLUSIVE OR gate 43 carries the M("1") and B("0") output signal. Flop 45 has a reset input R for external resetting upon initialization of the circuit.

It may be seen that if both the A and B inputs are a 1, the output of AND gate 42 is a 1, and the output lead 46 carries a 1.

Where the A input is a 0 and the B input is a 1, the output of AND gate 42 is a 0, and the output lead 46 of EXCLUSIVE OR gate 43 carries a 0.

Where the input on leads A and B are both 0's, the output of AND gate 42 is a 1, and the output of EXCLUSIVE OR gate 43 carries a 0.

Where input A is a 1 and input B is a 0, the output of AND gate 42 is a 0, and the output lead 46 of EXCLUSIVE OR gate 43 carries a 1.

The delay time in retriggerable delay circuit 44 takes care of the above-described time corrected recognition delay period, and should be adjusted to a reliable indication time T following the leading edge 2 (FIGS. 1A, 1B and 1C), which exceeds the time of the dial pulse current passing from the upper to the lower threshold.

FIG. 4 shows a second embodiment of the logic circuit portion of the invention. A microprocessor which includes a central processing unit 47 is connected via a data bus 48 to a read-only memory (ROM) 49, the operation being driven by a clock 50 in a well-known manner. The microprocessor can be of any well-known type, but is preferably type 6802 which is available from Motorola Inc. of the U.S.A. The principles of construction and operation of a microprocessor are believed to be well known to persons skilled in the art, and the reader is referred to the publication "MICROCOMPUTER PRIMER" by M. Waite and M. Pardee, published by Howard W. Sams & Co., Inc. of Indianapolis, Indiana, U.S.A. for a full description thereof, as well as to publications, data sheets, etc. from Motorola Inc.

The D0 and D1 leads in FIG. 2 are connected to similarly labelled leads of data bus 48 in FIG. 4. One of the leads of data bus 48, designated D8, carries the logical output signal from the microprocessor which is used by following pulse timing and recognition circuitry (not forming part of this invention).

Figure 5:
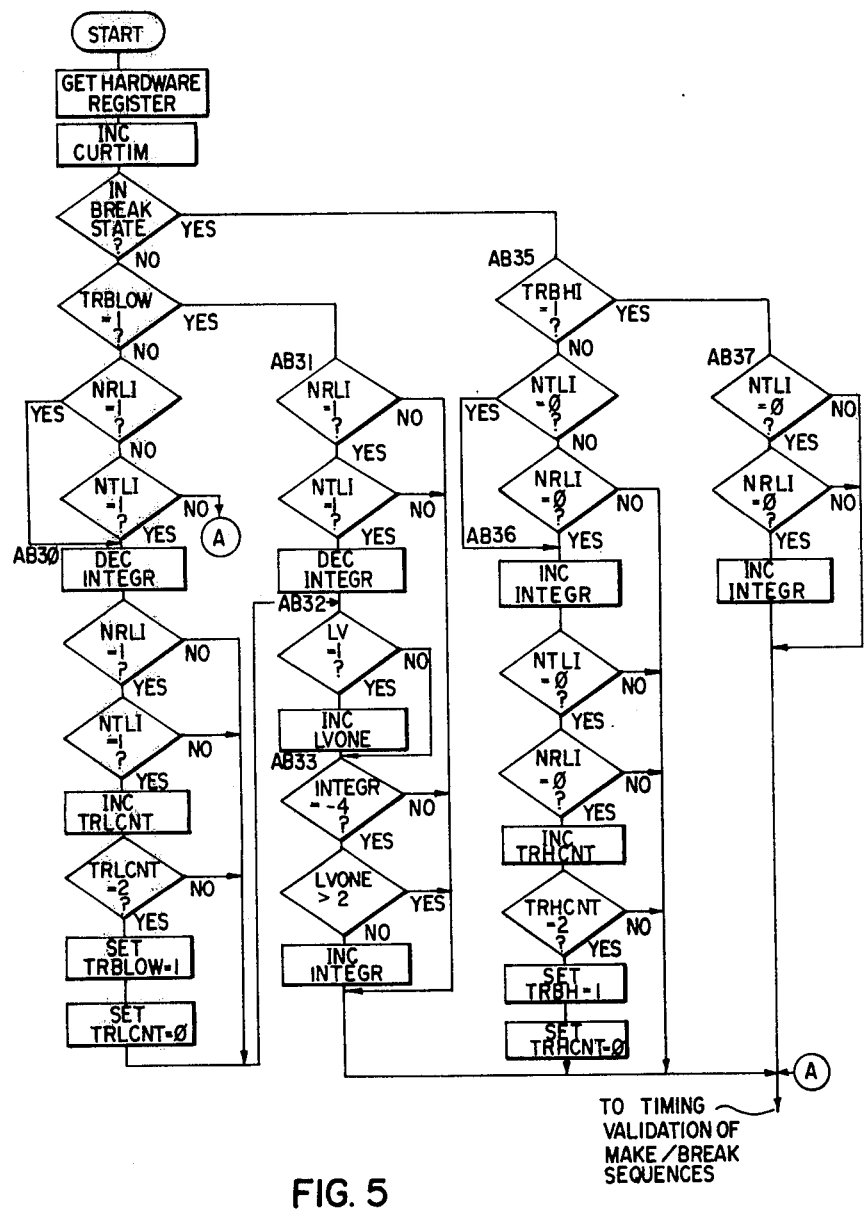
FIG. 5 is a flow chart of the logic to be followed by signals controlling the microprocessor in the second embodiment of the invention.

Signals are stored in the ROM (i.e. the equivalent of a physical cross connection field) which control the microprocessor and cause it to operate as a special purpose logic circuit. The signals stored are preferably generated according to the flow chart shown in FIG. 5 which describes the logical operation of the microprocessor, and an example list of the controlling signals expressed in 6802 mnemonic is given in Appendix A, which follow the flow chart sequences.

| ACRONYM | DEFINITION |
| --- | --- |
| INC CURTIM | increment current timer |
| TRBLOW | tip and ring current both low |
| NRLI | ring line current - not |
| NTLI | tip line current - not |
| DEC INTEGR | decrement integer counter |
| INC TRLCNT | increment tip and ring current low count |
| TRLCNT | tip and ring current low count |
| LV | line voltage |
| INC LVONE | increment line voltage count |
| LVONE | line voltage count |
| TRHCNT | tip and ring current high count |
| TRBHI | tip and ring current both high |

The flow chart exits at the operation "to timing validation of make/break sequences", which microprocessor sequences, not forming part of this invention, time and make and break pulse periods and indicate the presence of valid pulses to later pulse counting stages.

It has been found that use of the present invention has substantially increased the reliability of detection of valid dial pulses in solid state circuits in the face of grossly distorted dial pulse current waveforms. With the principles of the invention understood, a person skilled in the art may now design variations or other embodiments. All are considered within the sphere and scope of this invention, as defined in the claims appended hereto.

We claim:

1. A dial pulse detection circuit comprising:
   (a) means for detecting a first line current transition through a predetermined upper threshold, and for establishing a dial pulse leading edge in response to said detection,
   (b) means for ignoring a first line current transition through a predetermined lower threshold which follows said first transition through said upper threshold but detecting a second line current transition through said predetermined lower threshold and for establishing a dial pulse trailing edge in response to its detection, and
   (c) means for ignoring a second line current transition through said upper threshold following said second line current transition through said lower threshold, whereby a complete dial pulse is established.

2. A dial pulse detection circuit as defined in claim 1, in which said means for detecting line current transitions through the upper and lower thresholds includes first and second resistance means for respective connection in series with a tip and a ring lead, sensor means for sensing voltage drops across the first and second resistance means, and means connected to the sensor means for providing individual output 1 or 0 logic voltage levels depending on the sensed voltage drops to the means for establishing said leading and trailing edges, the first and second resistance means having different effective resistances for establishing the levels of the upper and lower thresholds.

3. A dial pulse detection circuit as defined in claim 1 in which said means for detecting line current transitions through said upper and lower thresholds are comprised of a first resistor for connection in series with a tip lead, a second resistor for connection in series with a ring lead, first active current translation means connected with its input terminals across the first resistor having a state of conduction dependent on a bias voltage developed across its input terminals, second active current translation means similar to said first translation means connected with its input leads across the second resistor, and means for providing individual 1 or 0 logic output voltage levels depending on the state of conduction of said first and second translation means, the first and second resistors having different effective resistances for establishing different thresholds of conduction for said first and second translation means, forming said upper and lower thresholds.

4. A dial pulse detection circuit as defined in claim 3, in which the first and second active translation means are each comprised of a pair of similar transistors, each pair of transistors having their base and emitter electrodes connected across the associated first or second resistors but in an opposite conductive sense, each pair having their collector electrodes connected together to form collector nodes, each collector node being adapted to carry a signal for translation into said 1 or 0 voltage level.

5. A dial pulse detection circuit as defined in claim 1, 2 or 4, in which the means for establishing the dial pulse leading edge, for ignoring the first line current transition through said lower threshold, for establishing the dial pulse trailing edge, and for ignoring the second line current transition through said upper threshold is comprised of a microprocessor controlled by signals stored in a ROM, having a data bus input connected to said means for detecting line current transitions through the first and second thresholds.

6. A dial pulse detection circuit as defined in claim 3, in which the first and second active translation means are each comprised of a pair of similar transistors, each pair of transistors having their base and emitter electrodes connected across the associated first or second resistors but in an opposite conductive sense, each pair having their collector electrodes connected together to form collector nodes, each collector node being connected to the input of a level shifting circuit, each level shifting circuit being adapted to provide said 1 or 0 voltage levels at their output terminals.

7. A dial pulse detection circuit as defined in claim 6, further including buffers having their inputs connected to the output terminals of the level shifting circuits, and their output terminals being adapted logic carry 1 or 0 voltage levels.

8. A dial pulse detector as defined in claim 6 or 7, further including a pair of EXCLUSIVE OR gates, each having one of its inputs connected in a circuit for reception of said 1 or 0 voltage levels, the outputs of the pair of EXCLUSIVE OR gates being connected to respective inputs of an AND gate, the output of the AND gate being connected both to an input of a third EXCLUSIVE OR gate and to the input of a retriggerable delay circuit, the output of the retriggerable delay circuit being connected to the input of a bistable edge triggered toggle flip flop, the output of the flip flop being connected to a second input of each gate of the pair of EXCLUSIVE OR gates, whereby a signal at the output of the third EXCLUSIVE OR gate is in the form of a square wave dial pulse signal.

9. A dial pulse detector as defined in claim 6 or 7, further including a pair of EXCLUSIVE OR gates, each having one of its inputs connected in a circuit for reception of said 1 or 0 voltage levels, the outputs of the pair of EXCLUSIVE OR gates being connected to respective inputs of an AND gate, the output of the AND gate being connected both to an input of a third EXCLUSIVE OR gate and to the input of an integration circuit, the output of the integration circuit being connected to the input of a bistable flip flop, the output of the flip flop being connected to a second input of each gate of the pair of EXCLUSIVE OR gates, whereby a signal at the output of the third EXCLUSIVE OR gate is in the form of a square wave dial pulse signal.

10. A dial pulse detection circuit comprising:
 (a) means for detecting the level of line current relative to a predetermined upper threshold, and for providing first 1 or 0 data output signals depending on said level,
 (b) means for detecting the level of line current relative to a predetermined lower threshold, and for providing second 1 or 0 data output signals depending on said level,
 (c) circuit means for receiving said first and second output signals and for establishing a dial pulse leading edge upon detection of a first line current transition to a level lower than the upper threshold and for establishing a dial pulse trailing edge upon subsequent detection of a line current transition from lower than the lower threshold to a level above the lower threshold.

11. A dial pulse detection circuit as defined in claim 10, in which said circuit means is comprised of a microprocessor including a ROM memory, the memory comprising means for controlling the microprocessor whereby the microprocessor is adapted to provide a pulse form of output signal, each pulse including said leading and trailing edges.

12. A dial pulse detection circuit as defined in claim 11, including a pair of resistors for respective connection in series with the line, in which the means for detecting the level of line current relative to the upper and lower thresholds are each comprised of a pair of similar transistors, each pair having their base and emitter electrodes connected across one of the resistors but in an opposite conductive sense, each pair having their collector electrodes connected together to form collector nodes, each collector node being connected to the input of a level shifting circuit including an output buffer, each level shifting circuit being adapted to provide and logic 1 or 0 voltage level at the output terminals of its associated buffer, and a data bus connected between the microprocessor and the output terminals of said buffers for carrying said logic signals.

13. A dial pulse detection circuit as defined in claim 10, in which said circuit means is comprised of a pair of EXCLUSIVE OR gates, each having one of its inputs connected in a circuit for reception of the 1 or 0 data output signals, the outputs of the EXCLUSIVE OR gates being connected to respective inputs of an AND gate, the output of the AND gate being connected both to an input of a third EXCLUSIVE OR gate and to the input of a retriggerable delay circuit, the output of the retriggerable delay circuit being connected to the input of a bistable edge triggered toggle flip flop, the output of the flip flop being connected to a second input of each of the EXCLUSIVE OR gates, whereby a signal at the output of the third EXCLUSIVE OR gate is in the form of a square wave dial pulse signal.

14. A dial pulse detection circuit as defined in claim 10, 11 or 13, in which the means for detecting the level of line current relative to the upper and lower thresholds is comprised of a first resistor for connection in series with a tip lead, a second resistor for connection in series with a ring lead, first active current translation means connected with its input terminals across the first resistor having a state of conduction dependent on a bias voltage developed across its input terminals, second active current translation means similar to said first translation means connected with its input leads across the second resistor, and means for providing individual 1 or 0 logic output voltage levels depending on the state of conduction of said first and second translation means, the first and second resistors having different effective resistances for establishing different said upper and lower thresholds of conduction for said first and second translation means.

15. A dial pulse detection circuit as defined in claim 10, 11 or 13, including a pair of resistors for respective connection in series with the line, in which the means for detecting the level of line current relative to the upper and lower thresholds are each comprised of a pair of similar transistors, each pair having their base and emitter electrodes connected across one of the resistors but in an opposite conductive sense, each pair having their collector electrodes connected together to form collector nodes, each collector node being connected to the input of a level shifting circuit, each level shifting circuit being adapted to provide said 1 or 0 voltage level at their output terminals, buffers having their inputs connected to the output terminals of the level shifting circuits, the output terminals of the buffers being connected to said circuit means for receiving.

16. A dial pulse detection circuit comprising:
    (a) means for detecting a first line current transition through a predetermined first threshold, and for establishing a dial pulse leading edge in response to said detection,
    (b) means for ignoring a first line current transition through a predetermined second threshold which immediately follows a transition through the first threshold, but detecting a second line current transition through the second threshold and for establishing a dial pulse trailing edge, and
    (c) means for ignoring a second line current transition through said first threshold, whereby a complete dial pulse is established.

17. A dial pulse detection circuit comprising:
    (a) means for establishing two different line current threshold levels, a first which is closer than the other to normal line current of a seized telephone line,
    (b) means for detecting a first line current transition through the first threshold, and for establishing a dial pulse leading edge in response to said detection,
    (c) means for ignoring a first line current transition through said other threshold which follows said transition through said first threshold, and detecting a second line current transition through said other threshold and for establishing a dial pulse trailing edge in response to its detection, and
    (d) means for ignoring a second line current transition through said first threshold following said second line current transition through said other threshold, whereby a complete dial pulse is established.

* * * * *